Patented Jan. 2, 1934

1,941,886

UNITED STATES PATENT OFFICE 1,941,886

EMULSION DECOMPOSING BODY

Charles Fischer, Jr., Wyoming, and Warren T. Reddish, Cincinnati, Ohio, assignors to The Kontol Company, Dallas, Tex., a corporation of Texas No Drawing. Continuation of application Serial No. 134,124, September 7, 1926. This application October 17, 1929. Serial No. 400,442

5 Claims. (Cl. 252—1)

Our invention relates to the art of reducing the viscosity of mineral oil sulphonates, and is particularly directed to a treatment for said sulphonates especially adapting them for use as reagents in the art of breaking oil and water emulsions.

This application is a continuation of our application, Serial No. 134,124, filed September 7, 1926.

The disclosure is made with particular reference to the oil and water emulsions which are undesirably incidental to the petroleum producing industry. These emulsions consist of oil and water, usually salt water, the percentage of the two components as well as the specie and amount of salt varying over a wide range.

One of the methods of disposing of or resolving these emulsions is to treat the emulsified oil and water with a chemical reagent which breaks the permanence of the emulsions and starts coalescence of the components. After coalescence has proceeded to a certain degree, the oil and water can be stratified by gravity settling, centrifugal force, filtration or other means and the readiness of the liquid mass for stratification varies directly with the degree of coalescence, i. e., the size of the gathered drops. The oil thus becomes free of its water content and is available for commercial use.

One class of chemical reagents adapted to break the permanence of an emulsion is the mineral oil sulphonic acids and their salts. The adaptability of several of the members of this class has been verified and their application to the breaking of emulsions is the subject matter of various patents and applications, for instance, Rogers Patent No. 1,299,385, dated April 1, 1919. Rogers describes his materials as follows:

"Sulfonic acids suitable for this use are now produced in considerable quantities in the treatment of high viscosity oils with fuming sulfuric acid to produce lubricants of the best grade, and also in the production of the highly refined oils used for medicinal purposes. I prefer to employ the sodium salt of such a sulfonic acid, which may be obtained by the direct neutralization of the acid with commercial sodium carbonate (normal)." Page 1, lines 16-26, incl.

As a matter of fact the sulphonic bodies described by Rogers fall into two general headings, the oil soluble mahogany or A layer sulphonates, and the sludge layer sulphonates which are highly water soluble.

In incorporating these reagents into the emulsions, great difficulty has been experienced because of the very viscous nature of the reagents.

In fact in cold weather these reagents become so gummy and sticky that it is practically impossible to pour, handle or manipulate them at all.

Moreover, the mahogany sulphonates exhibit the peculiar characteristic of showing an apparent increase in viscosity when attempts are made to thin them down with water. This increase in viscosity continues until the critical point is passed, after which the sulphonates will dissolve in the thinning body if the thinning body is properly chosen with respect to the solubility of the particular sulphonate. But this critical point is relatively high and it is often undesirable or impracticable to incorporate the quantity of dissolving liquid in the emulsions to be broken which would be necessary to render the reagent sufficiently fluid to handle. It is also desirable that these reagents be shipped to the oil fields in a state sufficiently fluid to be easily and readily handled at the point of use. The relatively large quantity of water which would be necessary to effect this fluidity would increase the freight rates very materially, if not prohibitively.

In order to render this class of reagents, whether water soluble or water insoluble, commercially available for breaking oil and water emulsions in the oil fields, it is highly desirable that a viscosity reducer be introduced and incorporated with the reagent prior to the shipment. The viscosity reducer must therefore be effective as such when introduced in relatively small quantities.

Moreover, we have discovered that the activity of petroleum sulphonates with respect to breaking crude petroleum emulsions can be materially increased, by regulated concentration. These products when concentrated to maximum activity, become tough, rubbery and gummy. In this condition they will not disperse when small quantities are added to an emulsion.

With too high a concentration the activity becomes too great and the phases of the emulsion are reversed, producing a mixed emulsion that is extremely difficult to break.

Any substance adapted to accomplish this viscosity reducing function must have two additional characteristics. (1) It must not detrimentally influence the readiness with which the emulsion breaking reagents enter the oil and water emulsion. (2) It must not detrimentally effect the emulsion breaking properties of the reagent itself, or retard the coalescence of the oil and water particles of the emulsion. It is also desirable that this viscosity reducer have an accelerating influence upon the coalescence of the oil and the water. Since inorganic precipitates are generally undesirable, it is also preferable that the viscosity remover have no precipitating effects upon the salts of the water component of the emulsion.

Therefore, an object of our invention is to reduce the viscosity of mineral oil sulphonates without adding very materially to their weight or bulk.

Another object of our invention is to provide a viscosity reducer for reagents of the class described, such viscosity reducer without detrimental effect to the emulsion entering tendencies of the reagent.

Another object of our invention is to provide a viscosity reducer for reagents of the class described, such viscosity reducer without detrimental effect to the emulsion entering tendencies of the reagent.

Another object of our invention is to provide a viscosity reducer for emulsion breaking reagents of the class described, such viscosity reducer adapted to accelerate positively coalescence of the components.

Another object of our invention is to provide a coalescence accelerator for oil and water emulsions.

Substances adapted to reduce the viscosity of the sulphonates include the alcohol series, ether, chloroform, toluene, and other members of the coal tar series.

A preferred example of the class of viscosity reducers adapted for this specified use is alcohol, grain or denatured, chemically pure or combined with water. About 5-10% of the viscosity reducer is added to the emulsion breaking chemical and provides a reagent sufficiently fluid to be easily handled. Commercial denatured alcohol of approximately 90% strength has been found to be a satisfactory viscosity reducer for the mineral oil sulphonate.

By the addition of predetermined amounts of alcohol, we produce a reagent that is capable of quick dispersion, and at the same time regulate the activity or breaking speed, so that the water is precipitated before the emulsion has had time to reverse.

This is not merely a matter of thinning, but the regulation of the dispersion of the reagent in the emulsion, and the regulation of the rate of activity, as indicated by viscosity tests.

In breaking the emulsion the reagent with the viscosity reducer incorporated therewith is introduced into the emulsion to be broken in the proportion of about one part of reagent to one thousand of the emulsion. One of the additional advantages of the viscosity remover of the nature described, is that the water may be added to the reagent and viscosity remover, the water mixing readily therewith and having an additional thinning or further viscosity reducing action on the substances. The emulsion treated with the reagent is heated to and maintained at a temperature between approximately 150°–200° F. until coalescence takes place.

The presence of alcohol in addition to reducing the viscosity of the reagent, seems to accelerate this coalescence by increasing the size of the gathering globules to several times the size shown in the absence of alcohol.

Our Patent No. 1,727,164, issued September 3, 1929, discloses the utility of employing a bituminous substance for the purpose of accelerating the coalescence of the oil and water. The bitumens preferably have melting points between 35° C. and 90° C. as tested by the ball and ring method of the American Society for Testing Materials specifications and are highly viscous substances. In fact, they are almost solid at ordinary temperatures, but when introduced into the mixture of sulphonates and alcohol the viscosity of the resulting mass is still further reduced in spite of the fact that alcohol has little effect on bitumen. Consequently, when bitumen is used in an emulsion breaking reagent of the class described, it is possible to reduce the percentage of alcohol by more than one-half, and still maintain the fluidity of the reagent as it would have been with double the amount of alcohol and no bitumen.

Thus we provide a viscosity reducer adapted to be incorporated with a chemical emulsion breaking reagent of the class described, said reagent and viscosity remover together readily emulsion-soluble, non-precipitating in respect to the salts of the water component of the emulsion, and adapted to accelerate the coalescence of the components of the oil and water emulsion, thereby hastening and facilitating stratification.

The following experimental data illustrates our invention.

A mixture of 60 parts B layer sodium sulphonate was added to 40 parts of A layer sodium sulphonate, and the mixture heated to a temperature of 200 F. with constant stirring until the total water content was reduced to 10%. This mixture was cooled to 70° F. One drop of this mixture was then added to 25 cc. of crude oil emulsion and heated to 110 F. for fifteen minutes in a water bath with occasional shaking. At the end of this time there was no water precipitated, the emulsion remaining unbroken except for slight color change. One drop of the same mixture was added to 25 cc. of crude oil emulsion and after shaking, one drop of alcohol was added, again shaken and the bottle was kept at 110 F. for fifteen minutes. At the end of this time no water had been precipitated, the emulsion retaining its original character except for slight color change.

To the mixture of A and B sulphonates previously described, was then added 25 parts of ethyl alcohol, and the mixture thoroughly incorporated and again tested. In the case where the alcohol was added directly to the reagent, 50% water was precipitated from the emulsion in fifteen minutes, the oil becoming clear, the centrifugal test showing only two tenths percent water remaining in the oil. In the case where the sulphonates were used along the centrifugal test showed 42% water remaining in the oil and where the sulphonates and alcohol were added successively to the emulsion the centrifugal test showed 41% water remaining in the oil. It is quite apparent that adding the alcohol to the emulsion separately has little or no effect, while adding the alcohol to the sulphonates assists greatly in the dispersion of the sulphonates and in the regulation of the rate of activity.

Having described our invention, we desire to be limited only by the ensuing claims:

1. A reagent for resolving petroleum and water emulsions, said reagent, comprising, a mineral oil sulfonic body of the type recovered from the refining of medicinal white oils and the like with strong or fuming sulfuric acid, and alcohol as a viscosity reducer a reagent disperser and accelerator of coalescence.

2. A reagent for resolving petroleum and water emulsions, said reagent, comprising, a mineral oil sulfonic body of the type recovered from the refining of medicinal white oils and the like with strong or fuming sulfuric acid, and aqueous aliphatic alcohol as a viscosity reduced a reagent disperser and accelerator of coalescence.

3. A reagent for resolving petroleum and water emulsions, said reagent, comprising, both A and B layer mineral oil sulfonic bodies of the type recovered from the refining of medicinal white oils and the like with strong or fuming sulfuric acid, and alcohol as a viscosity reducer a reagent disperser and accelerator of coalescence.

4. A reagent for resolving petroleum and water emulsions, said reagent, comprising, both A and B layer mineral oil sulfonic bodies of the type recovered from the refining of medicinal white oils and the like with strong or fuming sulfuric acid, and aqueous aliphatic alcohol as a viscosity reducer a reagent dispenser and accelerator of coalescence.

5. A reagent for resolving petroleum and water emulsions, said reagent, comprising, both A and B layer mineral oil sulfonic bodies of the type recovered from the refining of medicinal white oils and the like with strong or fuming sulfuric acid, and a viscosity reducer adapted to disperse readily the sulfonic bodies throughout the emulsion to be treated.

CHARLES FISCHER, JR.
WARREN T. REDDISH.